(12) United States Patent
Poggiagliolmi et al.

(10) Patent No.: US 7,918,078 B2
(45) Date of Patent: Apr. 5, 2011

(54) DEVICE FOR PICKING FRUITS USING MECHANICAL VIBRATION

(75) Inventors: Elio Poggiagliolmi, London (GB); Otis Johnston, Edmond, OK (US)

(73) Assignee: Meteorite Agricultural Equipment BV, Rotterdam (NL)

( * ) Notice: Subject to any disclaimer, the term of this patent is extended or adjusted under 35 U.S.C. 154(b) by 0 days.

(21) Appl. No.: 10/587,151

(22) PCT Filed: Jan. 24, 2005

(86) PCT No.: PCT/GB2005/000219
§ 371 (c)(1),
(2), (4) Date: Feb. 20, 2007

(87) PCT Pub. No.: WO2005/070190
PCT Pub. Date: Aug. 4, 2005

(65) Prior Publication Data
US 2007/0163222 A1    Jul. 19, 2007

(30) Foreign Application Priority Data

Jan. 23, 2004   (GB) .................................. 0401504.6

(51) Int. Cl.
*A01D 46/00* (2006.01)
(52) U.S. Cl. ...................................................... 56/340.1
(58) Field of Classification Search ............... 56/10.2 R, 56/328.1, 329, 337, 327.1, 340.1; 172/40
See application file for complete search history.

(56) References Cited

U.S. PATENT DOCUMENTS

| | | | | | |
|---|---|---|---|---|---|
| 3,225,529 | A | * | 12/1965 | King | 56/340.1 |
| 3,406,508 | A | * | 10/1968 | Fridley | 56/340.1 |
| 3,460,329 | A | * | 8/1969 | Overstreet, Jr. | 56/340.1 |
| 3,570,230 | A | * | 3/1971 | Pool et al. | 56/328.1 |
| 3,771,301 | A | * | 11/1973 | Favor | 56/340.1 |
| 3,793,815 | A | * | 2/1974 | Hughes | 56/340.1 |
| 4,128,986 | A | * | 12/1978 | Santarelli | 56/340.1 |
| 4,223,515 | A | * | 9/1980 | Borchard | 56/340.1 |
| 4,254,608 | A | * | 3/1981 | Friday | 56/340.1 |
| 4,706,231 | A | * | 11/1987 | Mueller et al. | 367/190 |
| 4,893,459 | A | * | 1/1990 | Orlando | 56/340.1 |
| 5,331,607 | A | * | 7/1994 | Roessler | 367/189 |
| 5,382,760 | A | * | 1/1995 | Staron et al. | 181/121 |

(Continued)

FOREIGN PATENT DOCUMENTS

FR           2536243           5/1984

(Continued)

OTHER PUBLICATIONS

English Abstract of FR 2639176.

(Continued)

*Primary Examiner* — Thomas B Will
*Assistant Examiner* — Joan D Misa
(74) *Attorney, Agent, or Firm* — Dykema Gossett PLLC

(57) ABSTRACT

A device for removing fruit from a plant comprising a vibratory head having means for clamping a fruit plant, and means for controlling the vibratory head, preferably an electronic control means. The vibratory head further comprises at least one reaction mass which is vibratably driveable and connected to the clamping means for relative movement therebetween to provide a unidirectional force transmittable between the reaction mass and the clamping means, and hence transmittable to the plant.

35 Claims, 5 Drawing Sheets

U.S. PATENT DOCUMENTS

| | | | | |
|---|---|---|---|---|
| 5,413,453 A | * | 5/1995 | Hill | 414/729 |
| 5,473,875 A | * | 12/1995 | Zehavi et al. | 56/340.1 |
| 5,842,333 A | * | 12/1998 | Brenek | 56/28 |
| 6,658,834 B1 | * | 12/2003 | Mayo | 56/340.1 |
| 6,945,022 B2 | * | 9/2005 | Suter et al. | 56/328.1 |
| 6,978,591 B2 | * | 12/2005 | Zehavi et al. | 56/340.1 |
| 2004/0079065 A1 | * | 4/2004 | Zehavi et al. | 56/340.1 |
| 2005/0252711 A1 | * | 11/2005 | Rau | 181/121 |

FOREIGN PATENT DOCUMENTS

| | | |
|---|---|---|
| FR | 2639176 | 5/1990 |
| WO | 2004066446 | 1/2004 |

OTHER PUBLICATIONS

English Abstract of FR 2536243.

* cited by examiner

DEVICE FOR PICKING FRUITS USING MECHANICAL VIBRATION

TECHNICAL FIELD

The present invention relates to devices for picking fruit, and in particular for picking olives.

BACKGROUND ART

The invention has been designed for picking olives, so the discussion of the background art and of the specific embodiments is limited to this particular application of the invention.

A known method for picking olives and other fruit is manual labour, whereby fruit is removed from trees by hand picking. This is both time-consuming and costly.

Also known are mechanical shaking devices which apply mechanical vibrations directly to the trunk or branches of an olive tree to remove olives, which may be gathered in a net placed on the ground, or by a vertical net having the shape of an upside down cone surrounding the tree trunk. The mechanical shaking method tends to damage the trees and leads to the unwanted removal of leaves and small branches. Some such methods employ a shaker head attachable to an olive tree-trunk or branch. The shaker head can oscillate with a power of up to 100 horse power and is driven by one or more hydraulic motors which impart rotary motion to eccentric masses. The eccentric masses generally comprise rotatable masses with a high inertia which is difficult to control and slow down. Response times for these machines are also slow. The consequences of component failure may also be dangerous in such machines, especially if the eccentric mass is rotating at the top end of its speed range. Some machines provide for adjustability of the speed of the rotating masses. Such oscillating machines generally apply very complicated oscillations of a single dominant frequency or over a very narrow width of dominant frequencies with little regard for the effect on the tree and its roots, and thus the trees are prone to damage often including substantial removal of leaves and/or twigs of the tree. The construction of these oscillating machines generally involves the shaker head being suspended from a carrying frame by means of chains or springs. Another disadvantage of these methods is that only the ripest olives are removed from the tree. The not so ripe olives, which may constitute as much as 40%-50% of the potential crop, remain attached to the plant. To recover as many of these olives as possible the plant is subjected to further mechanical shaking after one or several weeks have elapsed. Notwithstanding this successive treatment, a 10% to 15% residue of olives remains on the plant. Apart from its relative inefficiency, this method of detaching olives from the tree goes counter to one of the main requirements for making high quality extra virgin olive oil which is the use of the younger, less ripe olives. Under ideal conditions the number of trees cropped by this method can be as high as 40 per hour.

Devices are also used extensively to detach the fruit from the plant by beating action. A variety of devices, based on this principle, are being employed with varying degrees of success. The most popular consist of pneumatically, or electrically, powered combs made of light thin rods. These devices are mounted on the end of a pole. The other end of the pole is held and pulled by an operator in a comb-like motion through the plant's thin branches, which bear most of the fruit, while imparting oscillatory beating to the fruit, leaves and branches in the immediate vicinity of the comb's teeth. The olives are detached from the tree by the device's combined beating and combing action. Although with this method it is possible to remove almost all the fruit from the plant, a significant amount of small branches and leaves also fall to the ground and the bark of the larger branches is damaged in places by the beating action. One additional problem of all beating methods is that the olives do not fall vertically to the ground. A quantity of olives is thrown outside the gathering net placed on the ground around the tree. The resulting loss of crop and the accidental squashing of olives by the operator(s) walking over the gathering nets can reduce the harvest efficiency by as much as 10%-15%. In addition such methods are prone to bruising the olives, and unless the olives are processed for producing olive oil very soon after harvesting, they develop an increased level of acidity. If the level of acidity increases above 0.5%, the producer may no longer label the oil "extra virgin". Finally, all hand held methods of cropping olives are notoriously slow (one tree per hour per operator) and hence they are only practical for small groves.

SUMMARY OF INVENTION

The present invention provides a device for removing fruit from a plant comprising a vibratory head having means for clamping a fruit plant, and means for controlling the vibratory head, the vibratory head further comprising at least one reaction mass which is vibratably driveable and connected to the clamping means for relative movement therebetween to provide a unidirectional force transmittable between the reaction mass and the clamping means, and hence transmittable to the plant.

Advantageously, the present invention avoids the application of tangential forces to the bark of the tree. The control means can advantageously allow the frequency, phase and/or the amplitude of the vibrations of the reaction mass and thus the plant to be controlled. Special computer generated complex signal codes, designed to transmit maximum energy for detaching the olives, are transmitted with high fidelity to the tree trunk.

The power output from the vibratory head can be adjustable manually or controllable automatically by means of sensors placed on the vibratable body. The vibrations applied to the tree are not forced to be of an uncontrollable amplitude, phase or frequency. Moreover, the vibratory body can be prevented from emitting frequencies that couple substantial vibratory energy to the tree roots. The invention is thus more sympathetic to the tree, and does not damage it. The movement of the reaction mass can be substantially decoupled from the hydraulic arm, advantageously avoiding retro-transmission of the vibrations back to the tractor. By virtue of the various mechanical, electronic and electrical features of embodiments of the invention discussed below, the device is quick and effective, and can be controlled with substantially immediate effect.

Preferably, the drive means comprise at least one piston displaceably mounted in a cylinder of the body. The reaction mass may be hydraulically, pneumatically or electromagnetically driven.

With embodiments of the present invention, removal of leaves is avoided because the vibrations applied to the tree are not in a range which is likely to cause leaf detachment. Further there is no physical contact between the vibratory components of the present invention and the leaves and no beating being applied thereto, unlike in the known combing methods. Also, as a result, the fruit does not suffer bruising.

Advantageously, the vibrations of the reaction mass can be linear in direction and can be applied to the trunk or branch substantially normally to the longitudinal axis of said trunk or branch. This further avoids the application of tangential forces to the tree and consequent damage to the bark. In this connection, the drive means can advantageously be symmetrically arranged with respect to the tree. In one embodiment, two pistons are provided, one on either side of the trunk or branch. The pistons are then to be driven in synchronism to avoid the production of lateral forces or torques about the tree. Alternatively, two or more pistons can be placed radially around the tree trunk and driven sequentially to avoid the production of tangential forces. This drive means has the advantage of coupling the vibratory energy in the optimum direction for maximum transmission through those branches which impart oscillatory motion to the olive-stem.

In another advantageous development of the invention the vibrations applied to the tree can have a coded time-varying frequency with constant or time varying phase. For instance, the frequency can be swept from an initial sweep frequency to a lower final sweep frequency, or vice versa. Picking efficiency of 95% of the olives on the tree may thereby be achieved. It is also possible to include a modulation component in the frequency signal, which can vary with time, the phase being optionally time-variable also. The modulation component can have a low frequency (corresponding to olive-stem resonances) and a low amplitude (to avoid damage to tree and roots) and thereby excellent picking efficiency can be achieved.

To clarify the invention, the background theory is expanded below.

One way to detach efficiently pendulous fruit from the branches of a tree is to apply to the fruit translational and/or bending (shear) forces of a magnitude sufficient to pull or shear off the fruit from the stem. To induce fruit detachment by the application of translational forces, the pendulum-like non linear resonance properties of the fruit-stem can be exploited.

The non-linear oscillatory motion of the olive with the stem attached to a moving support (the tree branch) has been investigated using the Duffing oscillator mathematical model. According to this non-linear model the resonant frequency is a function of the driving force magnitude and its frequency, stem mechanical properties such as elasticity damping and physical dimensions of both stem and olive. Also under certain driving conditions the phase of the moving olive-stem locks to the phase of the applied drive; i.e. the resonant frequency of the olive-stem follows the frequency of the applied drive. This property is very useful because non linear resonance can be maintained over a wide range of magnitudes and frequencies. This is achieved with a modest amount of drive energy and without the need to synchronize the phase of the drive to that of the olive-stem oscillator Since it is likely that the physical dimensions and mechanical properties of stems and olives in a tree are all different, their resonant frequencies (both linear and non-linear) cover different ranges. Under these conditions it is more appropriate to employ time variant frequency signals such as a coded frequency sweep to cover a set or sets of resonant frequency ranges, rather than mono or narrow frequency band drives, as used in the prior art. When the trunk or branch is driven with a vibratory force, the frequency range for olive detachment should be limited to the set of resonances (linear and non-linear resonances) of branches with the attached stems and olives. In fact it may not be advisable to use frequencies as low as a few hertz to only cover the olive-stem set of resonances. At these low frequencies the resulting high amplitude motion applied to the tree trunk can displace and damage the tree's micro root system. To overcome this problem, the modulation components mentioned above are coded into the drive signal to produce low frequency sidebands of lower magnitude compared to the higher frequency components occupying the sweep frequency band. The resulting complex signal is not deleterious to the root system but still supplies energy to the olive-stem set of resonances.

By way of example, there now follows a detailed description of an embodiment of the invention with reference to the accompanying drawings.

DETAILED DESCRIPTION OF THE PREFERRED EMBODIMENTS

Figure 1:
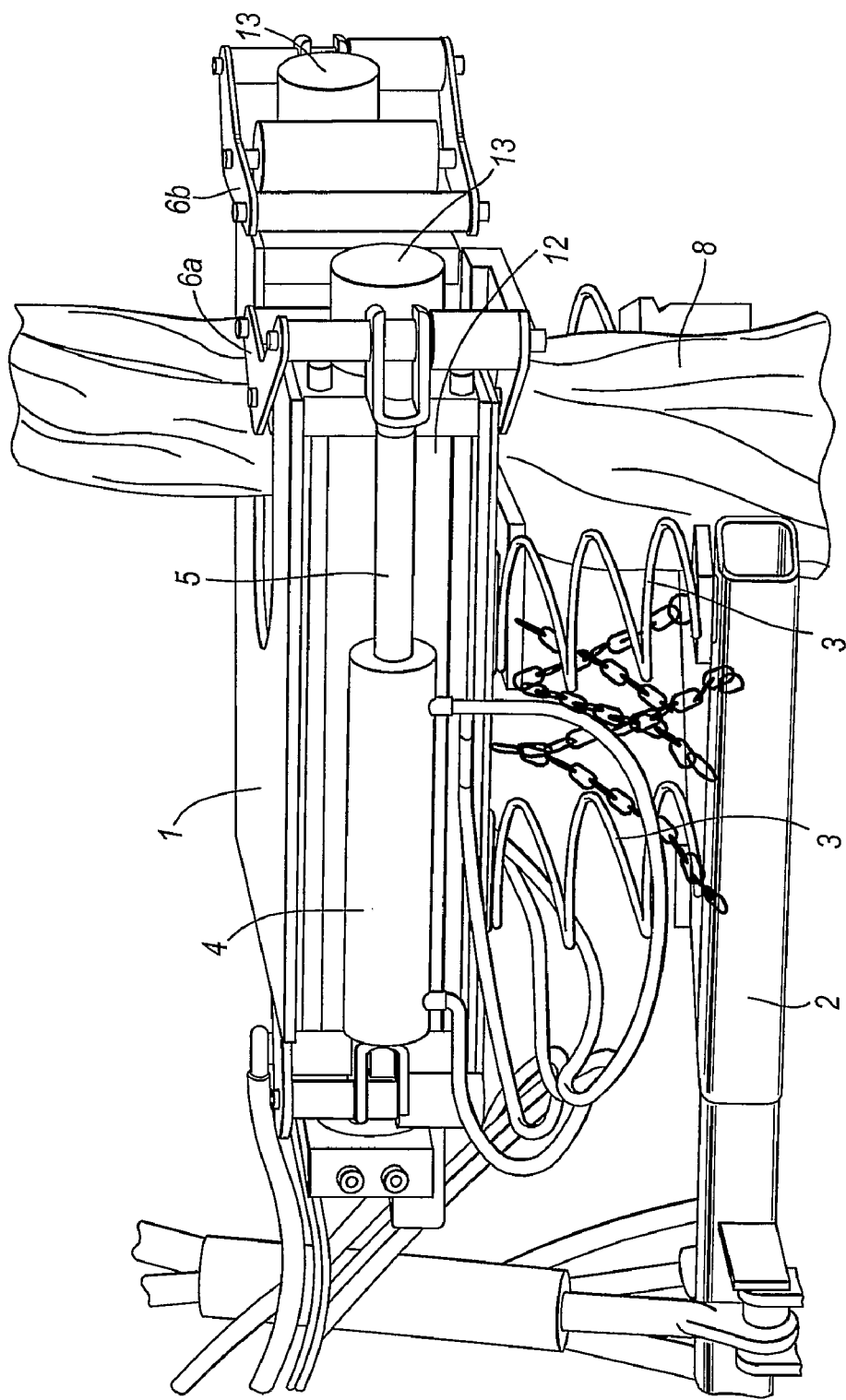
FIG. 1 shows an exemplary construction of the device according to a first embodiment of the invention.

In FIG. 1 can be seen a vibratory head comprising a vibratable body 1 engaged with the trunk 8 of an olive tree. The body 1 is resiliently attached to carrying means 2 in the form of a Y-shaped bracket 2 by means of springs 3. Thus, the body is decoupled from the hydraulic arm and hence the tractor. The body 1 more specifically is mounted on top of the bracket 2 and thus the springs 3 are in compression. The springs 3 need to be of sufficient strength to withhold the weight of the body 1, which can have a mass of 450 kg for example. The bracket 2 is disposed at the end of a robotic hydraulic arm as may be provided on a tractor for instance. Along the sides of the body 1 are provided a hydraulic cylinder 4 and a corresponding subsidiary piston 5 (not visible on the rear side) which serve to open and close adjustable arms 6a and 6b in order that the body may be securely held to the trunk 8 for effective transmission of vibrations therebetween. As viewed in FIG. 1, a first arm 6a, which is nearest the viewer, is provided with cushioning means in the form of a black rubber pad for abutment with the bark of the tree. A second arm 6b which is distal from the viewer is not provided with cushioning means. Alternatively, a pad could be located on the second arm 6b. In operation, the first arm 6a is rotated by means of the subsidiary piston 5 until the pad comes into contact with the bark. The second arm 6b lags behind the first arm, and after the first arm has come into engagement with the tree, the second arm comes into abutment with the first arm 6a and applies pressure thereto. It is thereby possible to adjust the pressure applied by arms 6a, 6b very finely, thereby allowing an optimum coupling of the vibratory energy between the body 1 and the tree 8 and avoiding undue stress on the bark. A corresponding pad is fixed to the vibratable body 1 for abutment with the opposite side of the branch. In this way it is provided that there are only two lines of contact between the pads and the tree, and the direction of the applied vibrational forces is parallel to the displacement between the two lines of contact. Thus there are no tangential forces applied to the bark avoiding damage thereto. There is also no need for lateral pads to be provided.

A pair of main pistons 13 are mounted in cylinders 12 and form part of the drive means responsible for vibrating the body 1. These are discussed in more depth below. An electronic control unit and a hydraulic pressure supply in the embodiment shown are mounted on the tractor (not shown) thereby facilitating user control. The hydraulic equipment placed on the rear of the tractor for connection of the hydraulic pump to the tractor's power take-off.

Figure 2:
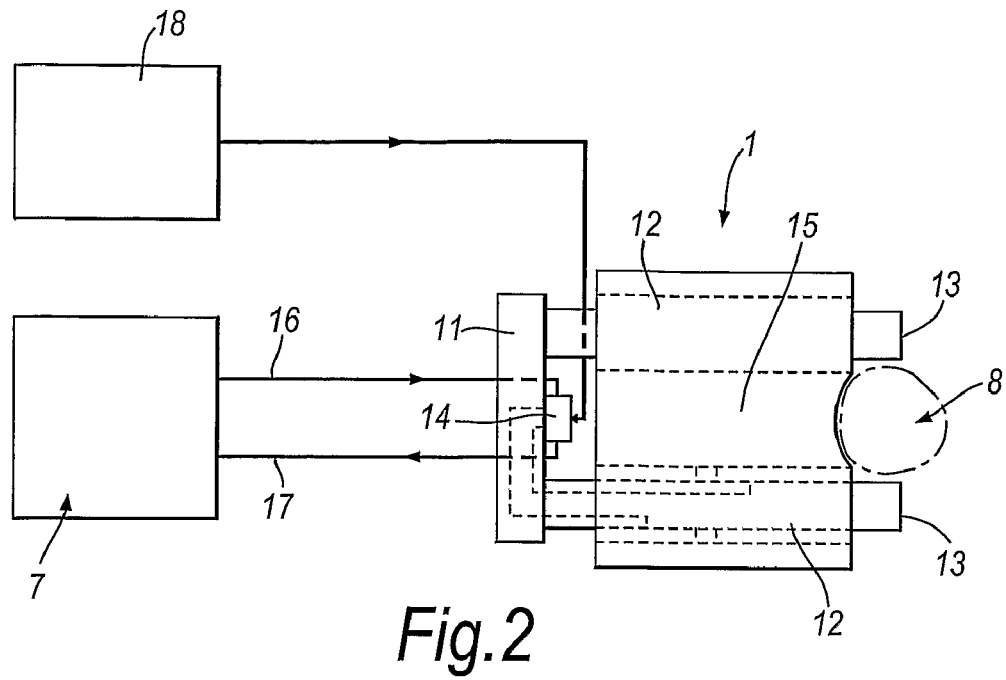
FIG. 2 is a schematic view of the first embodiment.

Some of the hardware required to implement the invention is shown schematically in FIG. 2. The vibratable body 1 contains drive means in the form of two hydraulic cylinders 12, each of which contains one of the corresponding main pistons 13. A hydraulic unit 7 discussed in more depth below provides pressurised fluid to a valve 14, more particularly a servo valve, and takes away low pressure fluid. Upper and lower holding plates 15 hold the vibratable body 1 together. The trunk or branch 8 is held against the body by the adjustable arms or clamps, which are not shown here. Vibrations of the body 1 are transmitted to the appropriate trunk or branch, and because the body can move with respect to the carrying means, transmission of the vibrations to the carrying means is inhibited. An electronic control unit 18 sends an electric signal s(t), represented by equation 1 below, to the servo valve 14 mounted on the central part of a manifold 11. This valve alternates the flow of hydraulic fluid, supplied by high and low pressure lines 16 and 17, to either the right side or the left side of piston/cylinder sealing rings via the ducts A and B respectively. Corresponding ducts are provided but not shown in connection with the second main piston 13, shown in FIG. 2 adjacent to the first main piston 13. The resulting translational motion imparted to the main pistons, relative to the cylinders, is the analog of the servo valve drive signal s(t). Reaction forces from the vibration of the main pistons, as internal masses, cause vibration of the body. In addition the two pistons provide the inertial mass (e.g. 350 kg) required to deliver a force of 30,000 N, which is sufficient to vibrate the tree strongly enough to remove olives.

In order to avoid damage to the tree bark, the vibrations are applied to the tree without tangential forces. This is achieved with the present structure of the device because the forces caused by the vibrations are linear in direction and are applied substantially normally to the longitudinal axis of the trunk or branch. By virtue of the two pistons 13 being controlled by the same valve 14, they remain in phase with each other, and thus do not produce tangential components of vibrational motion. Any form of drive means fulfilling such criteria is contemplated within the invention.

Figure 3:
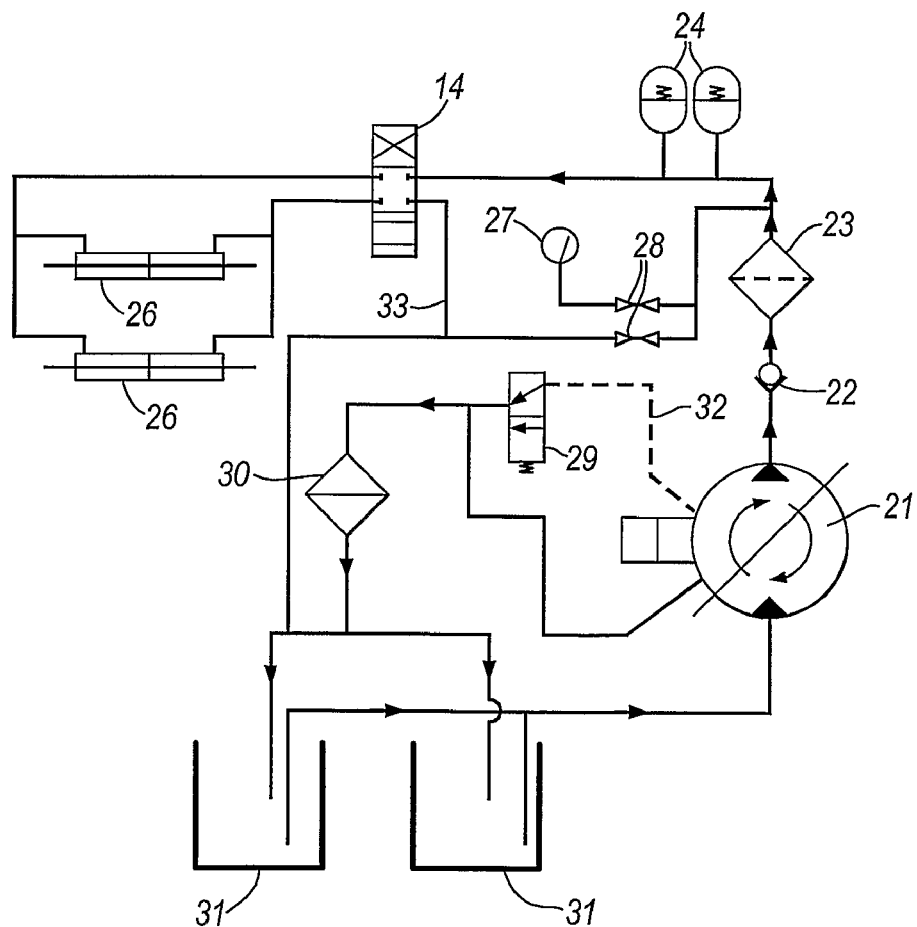
FIG. 3 is a schematic view of a hydraulic system forming part of the first embodiment invention.

A detailed hydraulic fluid flow schematic diagram is shown in FIG. 3. A hydraulic pump 21, driven from a tractor power supply increases the pressure of the fluid pumped from a tank 31 to 3,000 psi (20.7 MPa). The maximum pressure of the fluid is regulated by check valve 22 and after the fluid has gone through a filter 23 it is fed to the servo valve 14. This valve is controlled by the electronic control unit and as pointed out earlier, its function is to switch the direction of the fluid fed into the cylinders 12. Two nitrogen accumulators 24 are located along the high pressure line to dampen high energy impulses which could irreparably damage the pump or other components in the hydraulic circuit. A hand operated valve 28 B in the open position, bypasses the fluid from the high pressure line to the tank. Valve 28 A leads to a pressure gauge. The valves 28 A and 28 B are only operated during warm up and shut down operations. Due to the different pressures occurring throughout the hydraulic system, different hoses are used to cope with the stresses caused. The hydraulic pump 21 is connected to a hydraulic fluid reservoir 31 by suction hoses, whereas the hoses connecting the hydraulic pump 21 to the valve 14, via the intermediate components, are high pressure hoses. A high pressure pilot hose connects the hydraulic pump to a solenoid valve 29 which is operable to direct the hydraulic fluid e.g. oil, through a cooler 30 should such be necessary. After it has served its purpose of driving the hydraulic cylinders 26, the hydraulic fluid passes back to the reservoir 31 via a return hose 33.

In alternative embodiments of the invention not shown in the figures, it is envisaged that two or more pistons and cylinders are provided, the pistons being arranged orthogonally to one another. The pistons can further be arranged and driven so as to avoid the production of tangential forces. Such a construction advantageously allows a greater olive picking efficiency, by allowing excitation of the tree in more than one plane.

As shown in FIG. 2, the electronic control unit 18 is connected to the hydraulic equipment 7 and the valve 14. The control unit 18 emits a signal represented by equation (1) below which controls the valve 14 and hence the vibrations of the pistons 13.

Equation (1) defining the signal properties can be written as:

$$s(t)=\{\cos[(\acute{\omega}-\alpha t)t+m(t)]\}*g(t) \quad (1)$$

Where
s(t)=signal driving the servo valve
$\acute{\omega}=2\pi fh$
fh=initial sweep frequency
$\alpha$=frequency sweep rate=$2\pi(fh-fl)/sl$, fh>fl and (fh-fl)$\leqq$ $\Delta fd$
fl=final sweep frequency
sl=sweep length
$\Delta fd$=bandwidth suitable for olive detachment
m(t)=modulation function having a frequency value<<fl
*=convolution operation
g(t)=band pass filter function with a bandwidth~$\Delta fd$ Equation 1 shows that the signal essentially consists of a linear sweep parameter $\acute{\omega}-\alpha t$, and a modulating function m(t). This modulation function is a low frequency signal, which is optionally sinusoidal, and which causes the production of side band energy at the low end of the bandwidth $\Delta fd$. This side band energy drives the olive-stem system into resonance but due to its low amplitude does not inflict damage on the tree's micro root system. Lastly, the purpose of the band pass filtering function g(t) is to ensure that the frequency components emitted by the device are within the range of frequencies $\Delta fd$ which are suitable for detaching olives. As already pointed out above the emitted signal is band limited at the low frequency end to prevent root damage. The signal is also band limited at the high frequency end to reduce energy loss caused by the tree's spurious resonant modes and to concentrate the available energy within the frequency range for olive detachment. Also, the production of high frequencies is limited to prevent the detachment of leaves from the tree. It should be emphasized that the abovementioned signal type is not the only one that can be used with the embodiments of the invention. New signals can be programmed into the electronic control unit, the invention being flexible in this regard.

In operation, the user controls the robotic arm to guide the device into engagement with the tree. Then, the adjustable arms 6 are closed around the trunk or branch to secure the arrangement. Alternatively, it is also envisaged that the device be equipped with a position sensor which can take the form of an ultrasonic or a laser positioning device for instance, and means for automatically controlling the position of the body 1, whereby the user simply brings the device into proximity with a trunk or branch and the automatic control means then guide the body into engagement with the tree in a very short time, avoiding any potentially damaging contact with the bark which might occur before engagement. As with previous techniques, the olives can be gathered by placing a large net on the ground beneath the tree or by a vertical net shaped like an upside down cone with its narrower end secured to the base of the tree trunk. Vibrations as described above are then applied to the tree and the fallen olives collected.

Figure 4:
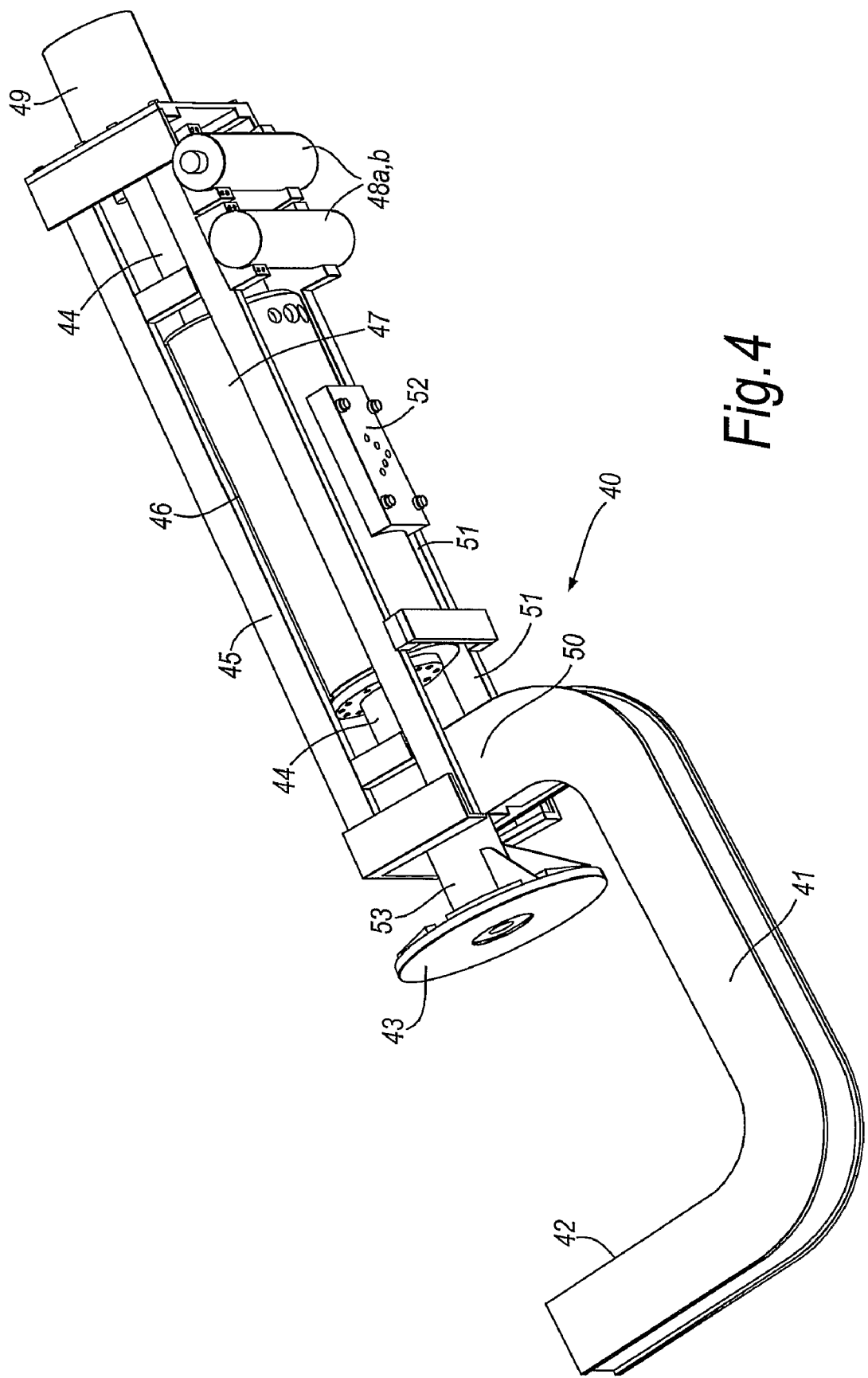
FIG. 4 is a schematic view of a second embodiment of the invention.
Figure 6:
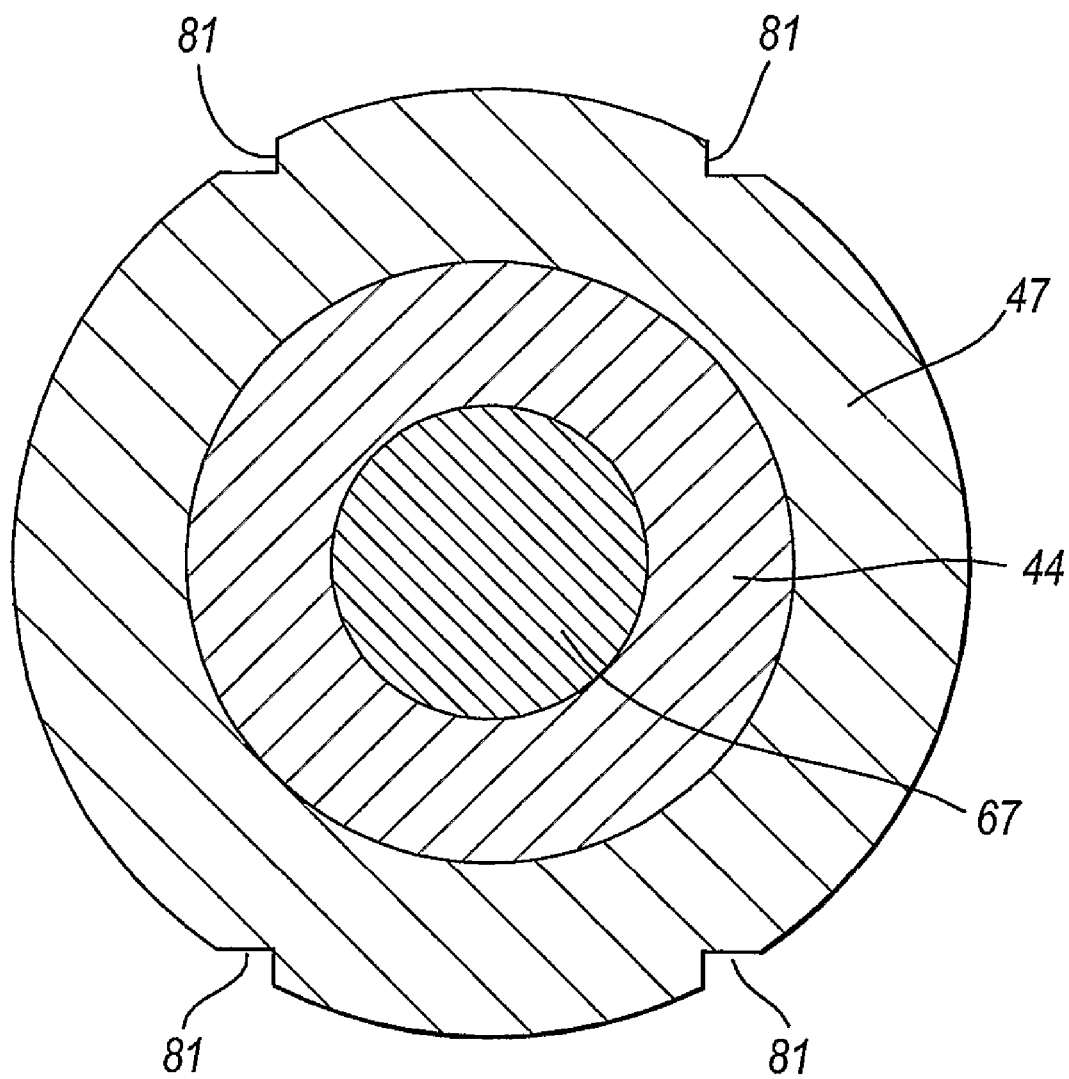
FIG. 6 is a schematic cross sectional view of a part of the second embodiment.

An alternative construction embodying the invention is shown schematically in FIG. 4. In this, the preferred embodiment, a C-shaped clamp 41 is provided at the distal end of the hydraulic arm (not shown), and is adapted to receive the trunk or branches of an olive tree. The C clamp 41 comprises a first arm 42 and a second arm 50, the first arm 42 having a first pad (not shown) for non-damaging contact with the bark of the tree. The second arm 50 comprises connection means for securing the C-clamp 41 to a main piston 44. A second pad (also not shown) is provided on a movable clamping element 43, which pad in use is brought into contact with the bark of the tree to firmly clamp the tree. As with the first embodiment, this arrangement allows applied vibrational forces which are parallel to the displacement between the respective lines of contact between the first and second pads and the bark, ie. substantially no tangential forces are applied to the bark. The clamping element 43 is provided on the end of a hydraulically driveable rod (not visible in FIG. 4) which is provided within the main piston 44. Therefore, the main piston 44 acts as a hydraulic cylinder itself within which the rod is hydraulically driveable. (See FIG. 6)

In contrast to the first embodiment, the drive means comprise one vibratory reaction mass 47 rather than two, which mass is arranged to vibrate along an axis which passes directly through the tree, although as before, more than one vibratory mass can be used, so long as the arrangement does not result in any significant tangential forces being applied to the bark. The vibrating mass comprises a cylinder 47 guided for vibrating along the axis by the cage 45. The cylinder 47 is slidably held in the cage 45 by four bars 51, although a smaller or larger number of bars could be utilised. Where the cylinder 47 rests against each bar 51, the latter has friction reducing means 46 to allow the cylinder 47 to slide with ease. In the preferred form of the second embodiment, the friction reducing means comprises Teflon® strips 46, extending substantially the length of the bar 51. The use of Teflon® strips 46 advantageously provides a simple slide construction with very few working parts.

The cage 45 is firmly attached to the hydraulic arm, with the cylinder 47 being freely slidable within the cage 45. The C-clamp 41 is firmly attached to the piston 44, which piston extends longitudinally through the entire length of the cylinder 47. The piston 44 is also movable relative to the hydraulic arm and the cage 45. A tube 49 can be provided for receiving the proximal end of the main piston 44, to protect the piston 44 from engaging with and being damaged by other components of the hydraulic arm. In practice, the tube 49 is not always necessary. Indeed, the length of the piston 44 need not be so great as to extend further back than the cage 45.

In operation, the user guides the C-clamp 41 into co-operation with the tree. The user brings the pad on the first arm 42 into engagement with the tree either by adjusting the position of the hydraulic arm or by moving the tractor itself. Then hydraulic pressure is applied through a solenoid valve (not shown) to extend the rod to bring the clamping element 43 and its pad into engagement with the tree. As with the first embodiment, the hydraulic system including its valves is controlled by the electronic control unit. With the tree firmly clamped, the hydraulic rod is held in its position relative to the main piston 44 by shutting the solenoid valve. It is then preferable to ensure that the piston 44 is centralised with respect to the cylinder 47 and that the cylinder 47 is centralised with respect to the cage 45. To centralise the piston 44, hydraulic fluid is fed as appropriate to cylinder chambers 47a, 47b, a process which can be done automatically under the control of the electronic control means. The position information of the main piston 44 with respect to the cylinder, required by the electronic control means, is continuously provided by a displacement transducer placed between the cylinder and the main piston. A variety of displacement transducers, including a linear variable differential transformer (LDTV), can be used to provide position information. The cylinder 47 is then to be centralised within the cage 45, and in this regard there is provided at each end of the cage a proximity sensor (not shown) which measures the distance to the cylinder 47. Using this information the hydraulic arm is adjusted to centralise the cylinder relative to the cage. Again, this process can be done automatically by the electronic control means. The hydraulic arm can include a telescopically extendable region, to allow such movement of the cage. Alternatively, the tractor can be moved to directly adjust the cage position. This relative centralisation avoids any banging of the cylinder 47 against the cage 45 at the limits of its motion.

Then, pressurized hydraulic fluid is applied to the cylinder 47 via the proportional valve (not shown). The proportional valve is mounted on a adapter plate 52 in FIG. 4. This valve is controlled by the electronic control unit and is operable to provide a switching action with a high fidelity reproduction of the electrical signal applied thereto. Thus, the pressurized hydraulic fluid is directed alternately by the valve to first and second hydraulic chambers of the cylinder 47, causing oscillatory relative motion between the cylinder 47 and the main piston 44.

The cylinder 47 acts as a reaction mass whose vibrations are transmitted via the piston 44 and the clamping element 43 and the C-clamp 41 to the tree. The cylinder 47 preferably has a substantial inertial mass e.g. 100 to 500 kg. Correspondingly, it is preferable that the main piston 44 and C-clamp 41 are as light as possible, since in use they are fast with the tree. In practice, a mass ratio of the components fast with the tree to the cylinder 47 of 1:3 has been achieved and has produced effective results.

Accelerometers or similar such sensors can be fitted on the cylinder 47 and on the C-clamp 41 to measure the acceleration, the amplitude and the relative phase of their motions. The cylinder motion and the C-clamp motion are primarily out of phase with each other, since when the hydraulic fluid is pushing the cylinder 47 in one direction, the corresponding force on the main piston 44, and hence the C-clamp is acting in the opposite direction. However, due to the compliance of the tree, this phase difference may vary. Using the sensors it is possible for the system to recognise the onset of any tree resonance, which might damage the tree, and to take automatic evasive action, eg. by reducing the amplitude and/or momentarily increasing rate of change of the frequency of the driving motion.

First and second pressure accumulators 48 are also shown in FIG. 4 and are provided to absorb and dampen unwanted high pressure impulses which could damage the other components of the assembly.

Figure 5:
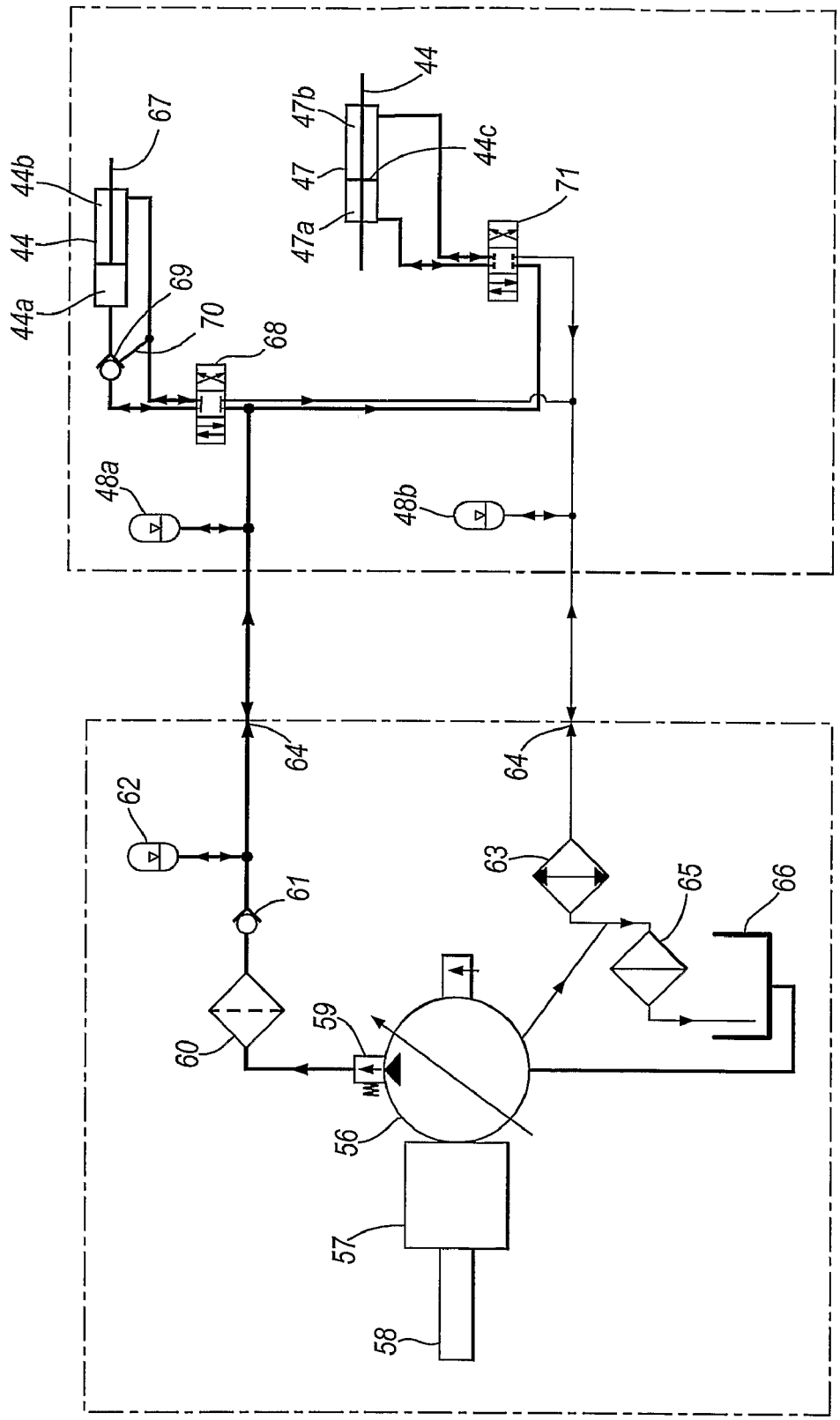
FIG. 5 is a schematic view of a hydraulic system according to the second embodiment.

FIG. 5 shows schematically the hydraulic system of the second embodiment. The assembly comprises three basic sub-assemblies: a three point hook-up for attaching the assembly to the rear of a tractor; the hydraulic arm which allows manipulation of the vibratory head, and the vibratory head itself situated at the end of the arm. In the left hand box of FIG. 5 are illustrated the components of the assembly which are mounted on the tractor three point hook-up subassembly. These components comprise firstly a hydraulic pump 56 connected via a speed increaser 57 to a tractor power take off shaft 58. The pressurised hydraulic fluid exits the pump 56 and goes through a high pressure relief valve 59, which in one embodiment allows through a range of pressures from 10 to 210 bar. This is followed by a high pressure filter 60 to remove impurities which in turn is followed by a check valve 61. Next is an accumulator 62 for dampening excessive pressure impulses in the system. From here, the high-pressure fluid is transmitted to the vibratory head via a first quick release connection means 64, allowing easy removal and replacement of the vibratory head sub assembly. The tractor mounted components further include a low-pressure return section where the hydraulic fluid returns, the section including a second quick release connection means 64, a low pressure filter 65, an oil cooler 63, and a reservoir 66 from which the hydraulic pump 56 sources hydraulic fluid.

In the vibratory head subassembly there is provided firstly the accumulator 48a corresponding to that shown in FIG. 4, followed by the solenoid operated valve 68, which in particular may be a four-way valve, which valve is operable to allow hydraulic fluid to enter a first cavity 44a inside the main piston 44 via a pressure control valve 69 to push the rod 67 outwards so as to clamp the tree. The pressure control valve 69 reduces the clamping pressure to an appropriate level for firmly gripping the tree without damaging the bark. By virtue of this pressure regulation, it is possible to use the same source of pressurized fluid for both the clamping mechanism and the vibratory mechanism. The pressure control valve 69 includes a flow partition line 70, extending from the valve 69 to the return conduit, which line allows the hydraulic fluid pressure applied to the cavity 44a to be reduced.

To withdraw the rod 67 from its clamping position after the olives have been removed from the tree, the valve 68 is operated, via the solenoid, to apply fluid to a second cavity 44b in the main piston 44. One of the objectives of the invention is to improve the harvesting rate, so it is desirable to open the clamp quickly. Therefore, hydraulic fluid is transmitted from the solenoid valve 68 to the cavity 44b at full pressure. This is achieved by providing opening conduits, separate to those illustrated in FIG. 5 (the closing conduits), connecting the solenoid valve 68 and the two cavities 44a,b which conduits transmit fluid at full pressure. Another possibility is for the pressure regulating valve 69 to be a two-way valve which restricts the fluid pressure in one flow direction (corresponding to the closing of the clamp) and allows full pressure in the opposite direction (corresponding to the opening of the clamp). The solenoid valve 68 itself could alternatively incorporate the necessary means to allow directionally dependent pressure control.

As an extra protection against overpressure in the clamping system, there can be provided along the high pressure line between the solenoid valve 68 and the cavity 44a, a check valve (not shown) which in the event of an overpressure diverts fluid through a run-off line, bypassing the piston cavities 44a,b and thereby avoiding damage to the piston/rod system.

When the tree is clamped, and harvesting is to begin the proportional valve 71 is operated, as mentioned above to centralise the main piston with respect to the cylinder located within the cage. In FIG. 5, the main piston 44, as shown inside the cylinder 47, is represented schematically by a thin line, which is of course not to scale. A piston ring 44c which is fixedly connected to the surface of the main piston 44 is also represented in FIG. 5. This ring is designed for withstanding the high forces resulting from the vibratory pressures in the cylinder 47. The proportional valve 71 is then operated to allow the pressurised hydraulic fluid to act on the respective cylinder chambers 47a and 47b alternately to cause the cylinder 47 and the main piston 44 (fast with its internal rod) to undergo vibratory motion relative to one another. Thereby, vibrations are applied to the tree, with virtually no retro transmission to the hydraulic arm and tractor. In other words, the vibrations of the cylinder, piston and C-clamp are substantially decoupled from the rest of the system.

The valve 71 can be electronically driven and the signal s(t) as specified above can be used, although other signals deemed suitable can be programmed into the control unit. A high fidelity reproduction of the signal is possible with the valve 71, despite the high fluid pressures which are involved e.g. 200 bar. A return conduit feeds hydraulic fluid leaving the cylinder 47 or the piston cavities 44a,b to the tractor-mounted components via a low-pressure accumulator 48b. The conduits which transmit fluid from the pump 56 to the cylinder 47 and the piston cavities 44a,b all need to withstand the high pressure of the fluid, so appropriate high strength hoses are used.

FIG. 6, again not to scale, is a cross-sectional view of part of the cylinder 47, showing the ends of the main piston 44 located inside the cylinder 47 and the rod 67 located inside piston 44 all concentric with one another. The cylinder chambers 47a,b and the piston cavities 44a,b cannot be seen in this view. The cylinder 47 includes a number of notches 81 corresponding to the number of Teflon® strips 46, the notches and strips having matching profiles for low-friction sliding contact therebetween.

Compared to known shaker heads, especially those of the rotating mass type, the vibratory head can be engaged with the tree at a relatively low height, since the amplitude of the vibrations of the vibratory head is low. The tree can be considered to effectively pivot about the ground level, such that oscillations applied near the base of the tree are amplified higher up the tree. Not only is this sympathetic to the tree but also it means the user should easily be able to find an appropriate point on the tree to engage the clamp. It is also possible to engage the vibratory head higher up in the tree, and in particular, it can be engaged with individual branches. The vibrations are transmitted almost entirely to the tree, and not back to the tractor via the hydraulic arm. A camera (not shown) can be provided on the vibratory head or hydraulic arm to relay pictures of the C-clamp and tree to the user of the assembly, who may be sitting in the cabin of the tractor. Thereby, the user is able to accurately guide the clamp into engagement with the tree. The user controls the assembly using a joystick which can be provided in the tractor cabin. Alternatively, a portable remote control can be provided. This can include an rf transmitter for transmitting signals to a corresponding receiver of the electronic control unit or can simply be wired to the electronic control unit. It is envisaged that a much smaller and lighter machine can be built, using the same principles, which applies coded signals to the smaller branches near to or where the olive stems are attached.

The invention claimed is:

1. A method of removing fruit from a plant during harvesting, comprising the steps of connecting drive means to the plant to apply vibrations thereto, wherein the vibrations have a time-variable frequency which is controlled by electronic control means, and applying vibrations to the plant while sweeping the frequency of the vibrations linearly or non-linearly from an initial sweep frequency to a final sweep frequency so as to remove the fruit from the plant, the vibrations being applied during harvesting, the vibrations being controlled by complex time variable signal codes designed to ensure fruit is removed while preventing root damage and leaf removal.

2. The method according to claim 1, wherein the vibrations are substantially unidirectional.

3. The method according to claim 1, wherein the vibrations are applied to the plant substantially normally to a longitudinal axis of the plant.

4. The method according to claim 1, including measuring acceleration or displacement of the vibrations using at least one sensor.

5. The method according to claim 4, further comprising the step of adjusting at least one of the frequency, phase and amplitude of the vibrations in dependence on sensor measurement.

6. The method according to claim 5, wherein said adjusting step comprises one of reducing vibration amplitude and momentarily increasing rate of change of the vibration frequency of the driving motion.

7. The method according to claim 1, including manually adjusting at least one of the frequency, amplitude and phase of the vibrations.

8. The method according to claim 1, wherein the initial sweep frequency is higher than the final sweep frequency.

9. The method according to claim 1, wherein the initial sweep frequency is lower than the final sweep frequency.

10. The method according to claim 1, wherein the vibrations include a modulation component which has a much lower frequency than the sweep frequency.

11. The method according to claim 1, further comprising the step of limiting the range of frequencies of the vibrations by means of a band pass filter.

12. The method according to claim 11, further comprising the step of omitting frequencies from the vibrations which cause leaf detachment from the tree.

13. The method according to claim 1, wherein the vibrations further have at least one of a phase and an amplitude which varies with time.

14. The method according to claim 1, wherein the frequency of the vibrations exploits the pendulum-like non-linear resonance properties of the fruit-stem combination.

15. A device for removing fruit from a plant comprising:
a vibratory head having means for clamping a fruit plant to apply vibrations to the plant, and means for controlling the vibratory head to vibrate at a time-varying frequency which sweeps linearly or non-linearly from an initial sweep frequency to a final sweep frequency,
the vibratory head further comprising at least one reaction mass which is vibratably driveable and connected to the clamping means for relative movement therebetween to provide a unidirectional force transmittable between the reaction mass and the clamping means, and hence transmittable to the plant, wherein the control means comprise electronic control means which also controls at least one of the amplitude and phase of the vibrations and supplies complex time variable signal codes designed to ensure fruit is removed while preventing root damage and leaf removal to control the vibratory head.

16. The device according to claim 15, wherein the or each reaction mass comprises at least one of a hydraulic cylinder and piston.

17. The device according to claim 16, wherein the hydraulic piston and cylinder are driven by pressurised fluid which is selectively applied to chambers of the hydraulic cylinder by a valve.

18. The device according to claim 16, wherein the reaction mass comprises a piston.

19. The device according to claim 16, wherein the reaction mass comprises a cylinder.

20. The device according to claim 16, including two cylinders and two pistons.

21. The device according to claim 16, including more than two pistons and cylinders arranged orthogonally to one another for placement around a trunk or branch of the plant and driveable sequentially.

22. The device according to claim 16, wherein the vibratory head is mounted on carrying means with respect to which the vibratory head is independently movable.

23. The device according to claim 16, wherein the drive means utilises electromagnetic or pneumatic force to oscillate the reaction mass.

24. The device according to claim 15, wherein the vibrations of the or each reaction mass are substantially unidirectional.

25. The device according to claim 15, wherein the vibratory force is applied to the plant substantially normally to the longitudinal axis of the plant.

26. The device according to claim 15, further comprising sensors for measuring at least one of the acceleration, velocity, and displacement of the vibrations.

27. The device according to claim 26, wherein at least one of the frequency, phase and amplitude of the vibrations of the reaction mass are adjustable in dependence on the sensor information.

28. The device according to claim 15, wherein the control means are manually adjustable.

29. The device according to claim 15, wherein the initial sweep frequency is higher than the final sweep frequency.

30. The device according to claim 15, wherein the initial sweep frequency is lower than the final sweep frequency.

31. The device according to claim 15, wherein the vibrations include a modulation component which has a much lower frequency than the sweep frequency.

32. The device according to claim 15, wherein the frequency range is limited by a band pass filter.

33. The device according to claim 15, wherein frequencies which cause leaf detachment from the tree are substantially omitted from the vibrations.

34. The device according to claim 15, wherein the reaction mass is slidably held in a cage of bars having friction reducing means.

35. The device according to claim 34, wherein the friction reducing means comprises Teflon® strips.

* * * * *